(12) United States Patent
Grandou et al.

(10) Patent No.: US 9,081,685 B2
(45) Date of Patent: Jul. 14, 2015

(54) DATA PROCESSING APPARATUS AND METHOD FOR HANDLING PERFORMANCE OF A CACHE MAINTENANCE OPERATION

(71) Applicant: ARM LIMITED, Cambridge (GB)

(72) Inventors: Gilles Eric Grandou, Tourrettes sur Loup (FR); Philippe Jean-Pierre Raphalen, Valbonne (FR); Andrea Mascheroni, Antibes (FR)

(73) Assignee: ARM Limited, Cambridge (GB)

( * ) Notice: Subject to any disclaimer, the term of this patent is extended or adjusted under 35 U.S.C. 154(b) by 244 days.

(21) Appl. No.: 13/741,658

(22) Filed: Jan. 15, 2013

(65) Prior Publication Data

US 2014/0201447 A1 Jul. 17, 2014

(51) Int. Cl.
*G06F 12/08* (2006.01)

(52) U.S. Cl.
CPC ........ *G06F 12/0804* (2013.01); *G06F 12/0811* (2013.01); *G06F 12/0897* (2013.01)

(58) Field of Classification Search
None
See application file for complete search history.

(56) References Cited

U.S. PATENT DOCUMENTS

2004/0215885 A1* 10/2004 Cargnoni et al. ............. 711/135
2004/0260880 A1* 12/2004 Shannon et al. ............. 711/122

* cited by examiner

*Primary Examiner* — Duc Doan
(74) *Attorney, Agent, or Firm* — Nixon & Vanderhye P.C.

(57) ABSTRACT

A data processing apparatus has data processing circuitry for performing data processing operations on data, and a hierarchical cache structure for storing at least a subset of the data for access by the data processing circuitry. The hierarchical cache structure has first and second level caches, and data evicted from the first level cache is routed to the second level cache under the control of second level cache access control circuitry. Cache maintenance circuitry performs a cache maintenance operation in both the first level cache and the second level cache. The access control circuitry is responsive to maintenance indication data to modify the eviction handling operation performed in response to the evicted data, so as to cause the required cache maintenance for the second level cache to be incorporated within the eviction handling operation.

17 Claims, 5 Drawing Sheets

DATA PROCESSING APPARATUS AND METHOD FOR HANDLING PERFORMANCE OF A CACHE MAINTENANCE OPERATION

BACKGROUND OF THE INVENTION

1. Field of the Invention

The present invention relates to a data processing apparatus and method for handling performance of a cache maintenance operation, and in particular to techniques for handling performance of cache maintenance operations in situations where a hierarchical cache structure is used.

2. Description of the Prior Art

A data processing apparatus will typically include data processing circuitry for performing data processing operations on data. Whilst the data processing circuitry could be arranged to communicate directly with memory to retrieve data to be processed, and to store the output data resulting from performance of the data processing operations, it is commonplace to provide a cache structure between the data processing circuitry and memory, with the cache structure being used to store at least a subset of the data for access by the data processing circuitry. The use of such a cache structure significantly reduces the latency that would otherwise result from the requirement to access memory.

For the purposes of the present invention, such a cache structure can take a variety of forms, for example a data cache used to store data values processed by the processing circuitry, an instruction cache with write capabilities and used to store instruction data identifying instructions for execution by the processing circuitry, a translation lookaside buffer (TLB) used to store page table information used when translating virtual addresses issued by the processing circuit into physical addresses, etc.

To enable a balance to be achieved between area and power consumption overhead, and access speed, it is known to provide hierarchical cache structures incorporating multiple levels of cache. For example, a level one (L1) cache may be provided as a first cache to be accessed when the processing circuitry issues an access request. Such a level one cache may have a relatively small storage capacity, but can be accessed very quickly. If the data is not found within the level one cache, then the access request can be forwarded on to a level two (L2) cache which will typically have a larger storage capacity than the level one cache. Various additional levels may be provided beyond the level two cache if required.

It is known to provide mechanisms for performing cache maintenance operations in respect of a cache. Considering a hierarchical cache structure, such cache maintenance operations may require cache maintenance to be performed in each level of the hierarchical cache structure.

Often, although not exclusively, such hierarchical cache structures are used in multi-processing systems where the data processing circuitry is formed of a plurality of separate processing units. The hierarchical cache structure may then be arranged so that each processing unit has its own separate level one cache. However, at a lower level of the hierarchical cache structure, for example at the level two cache, the cache may be shared amongst the processing units. ARM's Cortex-A9 processor is an example of such a multi-processor system. When performing a cache maintenance operation in association with a level one cache in such a system, if a hit occurs in the level one cache (i.e. the data associated with an address specified by the cache maintenance operation is found within the level one cache), then that data will be evicted from the level one cache, with that evicted data being routed to the level two cache. The handling of such evicted data, and the handling of the cache maintenance operation required in respect of the level two cache, will occur independently to one another. Indeed, since in the Cortex-A9 processor the level two cache is not integrated with the multi-core processor, there are in fact two different interfaces used to handle evictions sent to the shared external level two cache, and cache maintenance operations to be performed in respect of the shared external level two cache.

It is becoming more common to integrate a shared level two cache with a multi-core processor, ARM's Cortex-A7 and Cortex-A15 processors being two such examples which incorporate an integrated level two cache. In such processors, evicted data output from the level one cache as a result of a cache maintenance operation is processed in a serial way with respect to the cache maintenance operation to be performed in respect of the level two cache. As a result, the evicted data resulting from the performance of the cache maintenance operation in respect of the level one cache is forwarded to the level two cache and only when the level two cache has processed that evicted data is the cache maintenance operation forwarded to the level two cache for processing.

It would be desirable to provide an improved mechanism for handling cache maintenance operations requiring cache maintenance to be performed in multiple levels of a hierarchical cache structure.

SUMMARY OF THE INVENTION

Viewed from a first aspect, the present invention provides a data processing apparatus, said data processing apparatus comprising: data processing circuitry configured to perform data processing operations on data; a hierarchical cache structure configured to store at least a subset of said data for access by the data processing circuitry, said hierarchical cache structure having a first level cache and a second level cache, the hierarchical cache structure being responsive to an access request issued by the data processing circuitry and specifying an address, to access in the first level cache the data identified by the address if that data is stored in the first level cache, and to seek to access in the second level cache the data identified by the address if that data is not stored in the first level cache, and any data evicted from the first level cache being routed to the second level cache; access control circuitry associated with the second level cache and configured, in response to data evicted from the first level cache, to perform an eviction handling operation requiring access to the second level cache; cache maintenance circuitry configured to perform a cache maintenance operation requiring cache maintenance to be performed in both the first level cache and the second level cache; if the cache maintenance required in respect of the first level cache during performance of the cache maintenance operation causes data to be evicted from the first level cache, the cache maintenance circuitry being configured to cause maintenance indication data to be passed to the second level cache in association with the evicted data; the access control circuitry being responsive to the maintenance indication data to modify the eviction handling operation performed in response to the evicted data in order to cause the required cache maintenance for the second level cache to be incorporated within the eviction handling operation.

In accordance with the present invention, in situations where performance of the cache maintenance operation in respect of the first level cache causes data to be evicted from the first level cache, maintenance indication data is passed to the second level cache in association with that evicted data. This maintenance indication data causes the access control circuitry associated with the second level cache to modify the eviction handling operation so as to cause the required cache maintenance for the second level cache to be incorporated within the eviction handling operation. In such situations, this avoids the need for a separate cache maintenance operation to be issued to the second level cache after the second level cache has processed the evicted data. This reduces the number of accesses required to the second level cache, and also avoids the idle time associated with the known prior art techniques, where the cache maintenance operation is only forwarded to the second level cache once the evicted data from the first level cache has been processed by the second level cache.

The first level cache and the second level cache may take a variety of forms, but in one embodiment the first level cache is a level one (L1) cache and the second level cache is a level two (L2) cache. However, the invention can equally be applied between a level 2 and a level 3 cache, or between any two adjacent cache levels. Indeed the invention could also be applied recursively amongst multiple levels of cache by propagation of the maintenance indication data between the various cache levels.

There are a number of ways in which the eviction handling operation may be modified if the evicted data has associated maintenance indication data. In one embodiment, the evicted data is passed to the second level cache with a corresponding address indication, and the access control circuitry is configured, when performing said eviction handling operation, to use said corresponding address indication to perform a lookup within the second level cache to determine if a hit condition is detected, the hit condition identifying a cache line within the second level cache that is storing data associated with the corresponding address indication. If the hit condition is detected, the access control circuitry is further configured, when performing the eviction handling operation, to update the cache line identified by the hit condition with the evicted data. If the evicted data has associated maintenance indication data, the access control circuitry is configured to modify the eviction handling operation by additionally causing the evicted data to be placed in an eviction buffer associated with the second level cache, for subsequent eviction of the evicted data from the second level cache.

Hence, through modification of the eviction handling operation, the evicted data is placed in an eviction buffer associated with the second level cache, so that it will subsequently be evicted from the second level cache. In one embodiment, this modification to the eviction handling operation is performed irrespective of whether or not the hit condition is detected, and accordingly wherever the evicted data from the first level cache has associated maintenance indication data, the access control circuitry will modify the eviction handling operation in order to cause the evicted data to be placed in an eviction buffer associated with the second level cache.

In one embodiment, the manner in which the cache line is updated upon detection of the hit condition can also be varied dependent upon whether the evicted data has associated maintenance indication data. In particular, in one embodiment, if the evicted data does not have associated maintenance indication data, the access control circuitry is further configured, when updating the cache line identified by the hit condition with the evicted data, to mark the cache line as valid and containing dirty data. In contrast, if the evicted data has associated maintenance indication data, the access control circuitry is configured, when updating the cache line identified by the hit condition with the evicted data, to further modify the eviction handling operation by marking the cache line as valid but not containing dirty data. Hence, if the evicted data associated maintenance indication data, the updated cache line is marked as clean (as opposed to dirty). This is due to the fact that the evicted data used to update the cache line is also evicted from the second level cache, and accordingly the copy of the evicted data within the cache line will be the same as the data held within a lower level of the hierarchical cache structure, or within main memory.

In one embodiment, the eviction handling operation may be further modified dependent on the type of cache maintenance operation indicated by the maintenance indication data. In particular, in one embodiment, if the associated maintenance indication data identifies that the cache maintenance operation requires invalidation of the evicted data within the hierarchical cache structure, then the access control circuitry is configured to further modify the eviction handling operation by setting an invalid flag for the cache line identified by the hit condition instead of updating that cache line with the evicted data.

The second level cache may include a store buffer in which the evicted data is temporarily stored until the eviction handling operation has been performed by the access control circuitry. In one embodiment, if the evicted data has associated maintenance indication data, the access control circuitry is configured to cause the evicted data to be routed from the store buffer to the eviction buffer. By directly routing the evicted data from the store buffer to the eviction buffer, this provides a particularly efficient mechanism for performing the cache maintenance operation.

In one embodiment, if the hit condition is not detected (i.e. a cache miss condition is detected), the access control circuitry is further configured, when performing the eviction handling operation, to select a victim cache line from within the second level cache, to write the evicted data into the victim cache line, and to associate the corresponding address indication with that victim cache line.

When writing the evicted data into the victim cache line, the eviction handling operation can again be modified if the evicted data has associated maintenance indication data. In particular, in one embodiment, if the evicted data does not have associated maintenance indication data, the access control circuitry is further configured, when performing the eviction handling operation, to mark the victim cache line as valid and containing dirty data. In contrast, if the evicted data has associated maintenance indication data, the access control circuitry is configured to further modify the eviction handling operation by marking the victim cache line as valid but not containing dirty data.

In one embodiment, if the current data stored in the victim cache line at the time of selection by the access control circuitry is marked as valid and dirty, that current data is routed to the eviction buffer prior to writing the evicted data into the victim cache line and associating the corresponding address indication with that victim cache line.

The data processing circuitry and associated hierarchical cache structure can take a variety of forms. However, in one embodiment said data processing circuitry comprises a plurality of data processing units, said first level cache comprises a plurality of cache units, each cache unit being associated with a corresponding one of said data processing units, and said second level cache is shared by said plurality of data processing units.

In one such embodiment, the data processing apparatus further comprises a snoop control unit coupled between the first level cache and the second level cache, and configured to manage coherency of data within the cache units of the first level cache and the second level cache. The snoop control unit may be configured, in response to evicted data output by one of said cache units of the first level cache, to output the evicted data to the second level cache, and, if the evicted data resulted from performance of the cache maintenance operation, to output the maintenance indication data to the second level cache in association with the evicted data.

In one embodiment, the second level cache is integrated onto an integrated circuit that also provides said data processing circuitry and said first level cache. The techniques of the above described embodiments are particularly useful in situations where the second level cache is integrated with the data processing circuitry and the first level cache, as there is more flexibility to optimise the cache's micro-architectural design in order to incorporate the above described techniques.

In one embodiment, if the cache maintenance required in respect of the first level cache during performance of the cache maintenance operation does not cause data to be evicted from the first level cache, the cache maintenance circuitry is configured to directly initiate the required cache maintenance in the second level cache. Hence, in situations where performance of the cache maintenance operation results in a miss in the first level cache, then the conventional approach of using the cache maintenance circuitry to directly perform the required cache maintenance for the second level cache is adopted.

There are a number of ways in which the maintenance indication data can be provided to the second level cache in association with the evicted data. In one embodiment, the maintenance indication data is encoded into a control signal passed to the second level cache in association with the evicted data, the control signal is encoded with a value chosen from a first set of values to identify the maintenance indication data, and the control signal is encoded with a value not in said first set of values to identify that there is no maintenance indication data. In one particular embodiment, the control signal may already be provided for a different purpose, and the maintenance indication data can be encoded into that control signal, thus avoiding the need for any additional signal lines.

In one particular embodiment, the control signal is encoded with a first value chosen from said first set of values to identify that the associated evicted data has arisen from performance of a "clean" cache maintenance operation, and the control signal is encoded with a second value chosen from said first set of values to identify that the associated evicted data has arisen from performance of a "clean and invalidate" cache maintenance operation.

As mentioned earlier, whilst in one embodiment the modified eviction handling operation may be applied between any two adjacent cache levels in the hierarchical structure, it can also be applied recursively between multiple cache levels of the hierarchical structure. Hence, for example, in one embodiment the hierarchical cache structure may further comprise a third level cache, and the data processing apparatus further comprises further access control circuitry associated with the third level cache and configured, in response to data evicted from the second level cache, to perform a further eviction handling operation requiring access to the third level cache. If the evicted data from the first level cache has associated maintenance indication data, the access control circuitry associated with the second level cache is configured to modify the eviction handling operation by additionally causing the evicted data to be placed in an eviction buffer associated with the second level cache, for subsequent eviction of the evicted data from the second level cache to the third level cache. The further access control circuitry is responsive to maintenance indication data being identified in the evicted data received from the eviction buffer, to modify the further eviction handling operation performed in response to the evicted data in order to cause the cache maintenance for the third level cache to be incorporated within the further eviction handling operation.

Viewed from a second aspect, the present invention provides a method of handling performance of a cache maintenance operation within a data processing apparatus having data processing circuitry for performing data processing operations on data, and a hierarchical cache structure for storing at least a subset of said data for access by the data processing circuitry, said hierarchical cache structure having a first level cache and a second level cache, the hierarchical cache structure being responsive to an access request issued by the data processing circuitry and specifying an address, to access in the first level cache the data identified by the address if that data is stored in the first level cache, and to seek to access in the second level cache the data identified by the address if that data is not stored in the first level cache, and any data evicted from the first level cache being routed to the second level cache, the method comprising: in response to data evicted from the first level cache, performing an eviction handling operation requiring access to the second level cache; performing a cache maintenance operation requiring cache maintenance to be performed in both the first level cache and the second level cache; if the cache maintenance required in respect of the first level cache during performance of the cache maintenance operation causes data to be evicted from the first level cache, issuing maintenance indication data to the second level cache in association with the evicted data; and responsive to the maintenance indication data, modifying the eviction handling operation performed in response to the evicted data in order to cause the required cache maintenance for the second level cache to be incorporated within the eviction handling operation.

Viewed from a third aspect, the present invention provides a data processing apparatus, said data processing apparatus comprising: data processing means for performing data processing operations on data; a hierarchical cache means for storing at least a subset of said data for access by the data processing means, said hierarchical cache means having a first level cache means and a second level cache means, the hierarchical cache means being responsive to an access request issued by the data processing means and specifying an address, to access in the first level cache means the data identified by the address if that data is stored in the first level cache means, and to seek to access in the second level cache means the data identified by the address if that data is not stored in the first level cache means, and any data evicted from the first level cache means being routed to the second level cache means; access control means associated with the second level cache means and, in response to data evicted from the first level cache means, for performing an eviction handling operation requiring access to the second level cache means; cache maintenance means for performing a cache maintenance operation requiring cache maintenance to be performed in both the first level cache means and the second level cache means; if the cache maintenance required in respect of the first level cache means during performance of the cache maintenance operation causes data to be evicted from the first level cache means, the cache maintenance means for causing maintenance indication data to be passed to the second level cache means in association with the evicted data; the access control means, responsive to the maintenance indication data, for modifying the eviction handling operation performed in response to the evicted data in order to cause the required cache maintenance for the second level cache means to be incorporated within the eviction handling operation.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
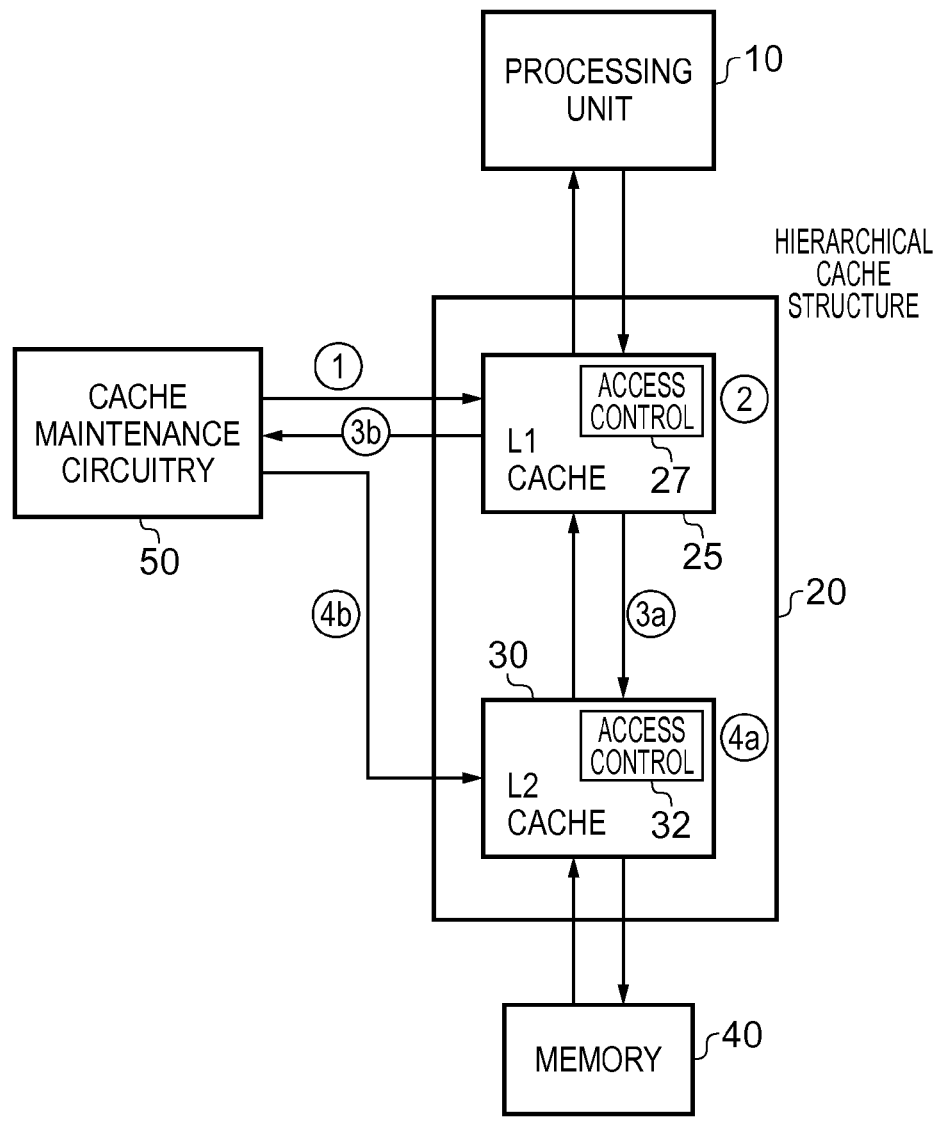
FIG. 1 is a block diagram of a data processing apparatus in accordance with one embodiment.

FIG. 1 is a block diagram of a data processing apparatus in accordance with one embodiment. A processing unit 10 is provided for performing data processing operations on data. A data value processed by the processing unit may have an address associated therewith, identifying an address within the memory 40. However, to avoid the latency that would result from accessing data directly from the memory 40, a hierarchical cache structure 20 is provided between the processing unit 10 and the memory 40. In this example, the hierarchical cache structure comprises both a level one cache 25 and a level two cache 30. Typically, the level one cache 25 will have a smaller storage capacity than the level two cache 30, but can be accessed more quickly than the level two cache 30. Cacheable data being used by the processing unit will be cached within the level one cache 25, but that data can subsequently be evicted to the level two cache 30 (or to a further lower level of the cache hierarchy if such a further level is provided) to free up space within the level one cache. As will be understood by those skilled in the art, various cache allocation policies can be used within the hierarchical cache structure, but ideally the data being used most frequently by the level one cache 25 resides within the level one cache, with data being used less frequently residing within the level two cache 30. Data within the level two cache 30 can then be evicted back to memory 40 to free up space within the level two cache.

Each cache 25, 30 will typically have associated access control circuitry 27, 32 to control access to the tag RAMs and data RAMs of each cache. As will be well understood by those skilled in the art, a data RAM will typically consist of a number of cache lines, with each cache line typically storing multiple data values. For each cache line in the data RAM, there will be a corresponding entry in the tag RAM used to store a portion of an address associated with all of the data values in the corresponding cache line of the data RAM, along with the certain control bits such as a valid bit identifying that the cache line is valid, and a dirty bit identifying whether the contents of the cache line are clean or dirty. If the cache line's contents are clean, this means that the current version of the data stored in the cache line is the same as that held within a lower level of the hierarchical cache structure or within memory 40. If the cache line is marked as dirty, that means that the contents of the cache line are more up-to-date than any copy of that data held within a lower level of the hierarchical cache structure, or within memory 40.

Cache maintenance circuitry 50 is provided for performing cache maintenance operations in respect of the hierarchical cache structure. In one embodiment, such cache maintenance operations require cache maintenance to be performed in both the level one cache 25 and the level two cache 30. Typically the cache maintenance operation will specify an address, and a type of maintenance operation to be performed in respect of any data held for that address within the caches of the hierarchical cache structure. For example, one type of cache maintenance operation is a clean maintenance operation, which is used to ensure that any copy of the data for the specified address that is held within the cache is marked as clean. If that data is found to reside within a cache, but the cache line is currently marked as dirty, the maintenance operation will require that data to be evicted to a lower level of the cache hierarchy, and ultimately to memory 40, so as to enable the dirty bit to be updated to mark the line as clean. Another type of maintenance operation is a clean and invalidate operation. This is similar to the above described clean operation, but requires any copy of the data found to reside within the cache to be marked as invalid. As a result, if the processing unit subsequently requests data from that address, it will need to be refetched from memory 40.

FIG. 1 shows a sequence of steps taken to perform such a cache maintenance operation in accordance with one embodiment. In particular the circled numbers 1 to 4b identify a sequence of steps that may be performed. At step 1, a maintenance operation is issued from the cache maintenance circuitry 50 to the level one cache 25. As a result, at step 2, the access control circuitry 27 performs a lookup operation within the cache array of the level one cache (formed by the earlier-mentioned tag and data RAMs) in order to determine whether the data identified by the address specified within the cache maintenance operation resides within the level one cache. If the cache lookup operation identifies that the data at the specified address is held within a cache line of the level one cache (a so-called hit condition), and that cache line is marked as dirty, then as indicated by the step 3a, it will be necessary to evict the contents of that cache line to the level two cache 30. In accordance with the described embodiments, in such a situation, the cache maintenance circuitry will also cause maintenance indication data to be passed to the level two cache 30 in association with that evicted data to identify the type of cache maintenance operation that resulted in that evicted data being generated.

The access control circuitry 32 will be arranged to perform an eviction handling operation to process any evicted data routed to it from the level one cache, typically this involving allocating the evicted data into a cache line of the level two cache. In accordance with one embodiment, where that evicted data is accompanied by maintenance indication data, the access control circuitry 32 modifies the eviction handling operation at step 4a in order to cause the required cache maintenance for the second level cache (i.e. the cache maintenance required in order to perform the cache maintenance operation issued by the cache maintenance circuitry 50) to be incorporated within the eviction handling operation. This avoids the need for a separate cache maintenance step to be performed by the level two cache after the evicted data has been processed. This hence significantly improves the efficiency of handling the cache maintenance operation in situations where performance of the cache maintenance operation in respect of the level one cache 25 has resulted in evicted data being forwarded to the level two cache 30.

If the lookup performed by the access control circuitry 27 in the level one cache 25 at step 2 in response to the cache maintenance operation identifies that the data corresponding to the address specified by the cache maintenance operation does not reside within the level one cache (a cache miss condition), then no data will need to be evicted from the level one cache, and instead a cache miss indication is returned at step 3b to the cache maintenance circuitry 50. Similarly, if the lookup results in a cache hit, but the cache line is already marked as clean, then again no eviction will be required from the level one cache, and at step 3b a control signal will be issued back to the cache maintenance circuitry 50 to identify that no such eviction has been performed. For the purposes of describing how cache maintenance operations are processed in accordance with the described embodiments, a hit on a clean line in the level one cache is processed in exactly the same way as a miss in the level one cache, and accordingly hereafter any reference to a cache miss should also be considered to include the example of a cache hit on a clean line.

In response to such a cache miss, then as shown at step 4b the cache maintenance circuitry separately issues the maintenance operation to the level two cache. The access control circuitry 32 then performs an analogous operation in respect of the level two cache 30 as described earlier for the access control circuitry 27 in respect of the level one cache 25.

Figure 2:
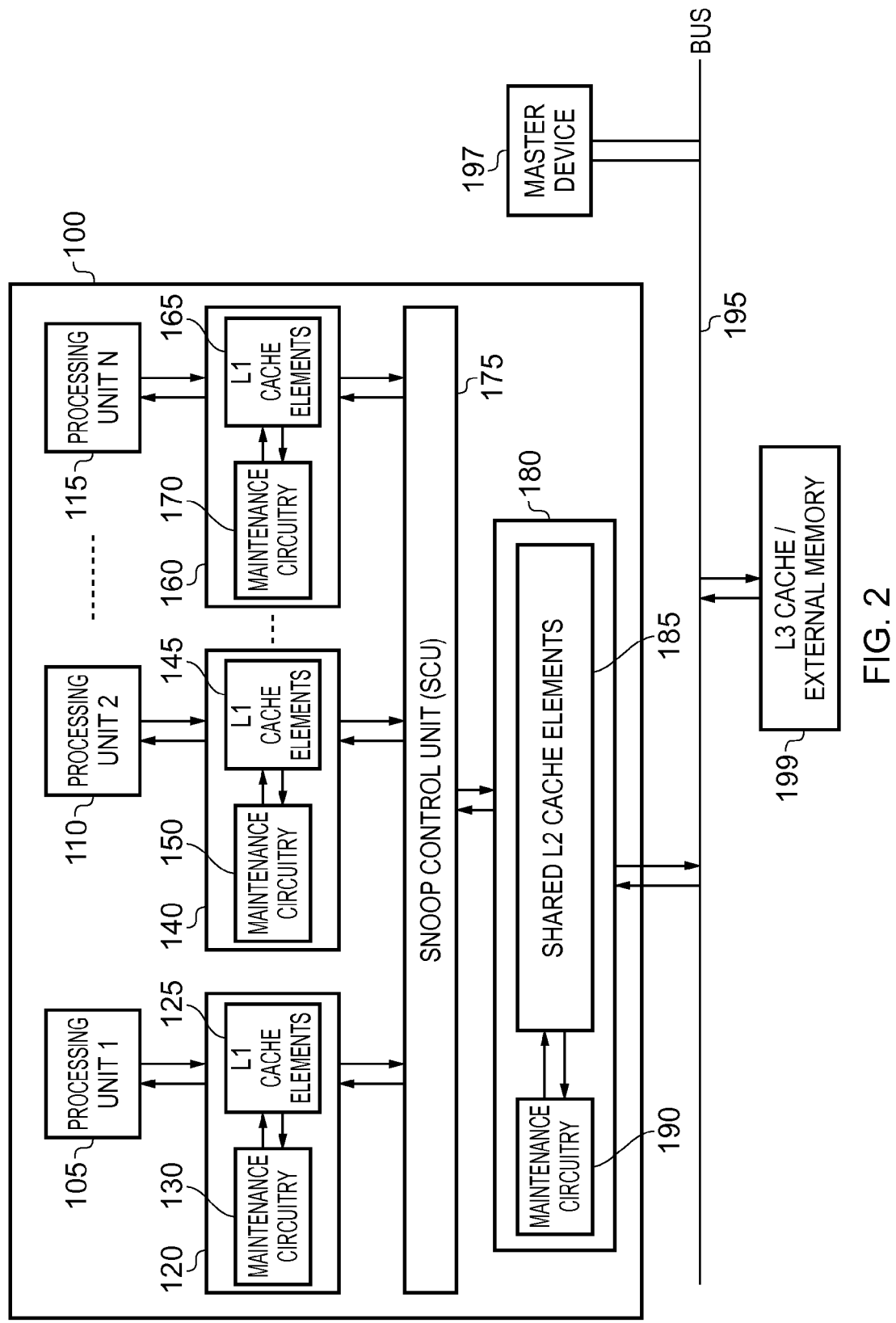
FIG. 2 is a block diagram of a data processing apparatus in accordance with an alternative embodiment.

Whilst the embodiment of FIG. 1 considers a situation where the processing circuitry takes the form of a single processing unit 10, it is often the case that hierarchical cache structures are used in multi-processor systems. FIG. 2 is an example of an alternative embodiment incorporating such a multi-processor arrangement. As shown, an integrated circuit 100 includes a series of processing units 105, 110, 115, each processing unit having an associated level one cache 120, 140, 160. Each level one cache will include a variety of cache elements 125, 145, 165 (for example the cache arrays and associated cache access circuitry) and will also include associated maintenance circuitry 130, 150, 170 for performing cache maintenance operations. Whilst in FIG. 2 these maintenance circuitry blocks are shown as being incorporated within the corresponding level one caches 120, 140, 160, in an alternative embodiment such maintenance circuitry may be external to the level one cache, for example being provided in association with the processing units 105, 110, 115.

As shown in FIG. 2, each of the level one caches 120, 140, 160 is coupled to a shared level two cache 180 via a snoop control unit (SCU) 175. The shared level two cache 180 incorporates shared level two cache elements 185 (including the cache array and the access control circuitry) and associated maintenance circuitry 190 for performing cache maintenance operations in respect of the shared level two cache.

The SCU 175 is used to ensure coherency of the data held within the various caches of the hierarchical cache structure. In particular, whilst providing each processing unit with its own associated level one cache improves speed of access to data, it complicates the issue of data coherency. In particular, if one processing unit updates a data value within its local level one cache, it is important to ensure that any other processing unit seeking access to the same data will also see the latest version of that data. The SCU 175 ensures this by implementing a cache coherency protocol. In particular, certain accesses performed by a processing unit will be notified to the SCU 175, as they will require a coherency operation to be performed. The coherency operation will cause the SCU to send a notification to the other level one caches identifying the type of access taking place and the address being accessed. This will cause those other caches to perform certain actions defined by the cache coherency protocol, for example either updating any local copy of that data stored, or invalidating any local copy of that data stored.

In accordance with the described embodiment, the SCU will also ensure that any evicted data from a level one cache is routed on to the shared level two cache 180, and will ensure that if the evicted data has resulted from the performance of a cache maintenance operation, then appropriate maintenance indication data will also be passed on to the level two cache in association with the evicted data.

Typically, the shared level two cache 180 will also be coupled via a bus 195 with lower levels of the cache hierarchy and/or external memory (indicated collectively by the box 199 in FIG. 2). One or more other master devices 197 may also be able to access such lower levels of the cache hierarchy/external memory via the bus 195.

In one embodiment, two types of cache maintenance operation that may be performed within the integrated circuit 100 are a "clean" cache maintenance operation and a "clean and invalidate" cache maintenance operation. Both of these cache maintenance operations will require any valid and dirty data to be evicted from the caches down to the level three cache/external memory 199. In the case of the clean and invalidate cache maintenance operation, this will also require any copies of the data held within any of the caches to be invalidated.

Figure 3:
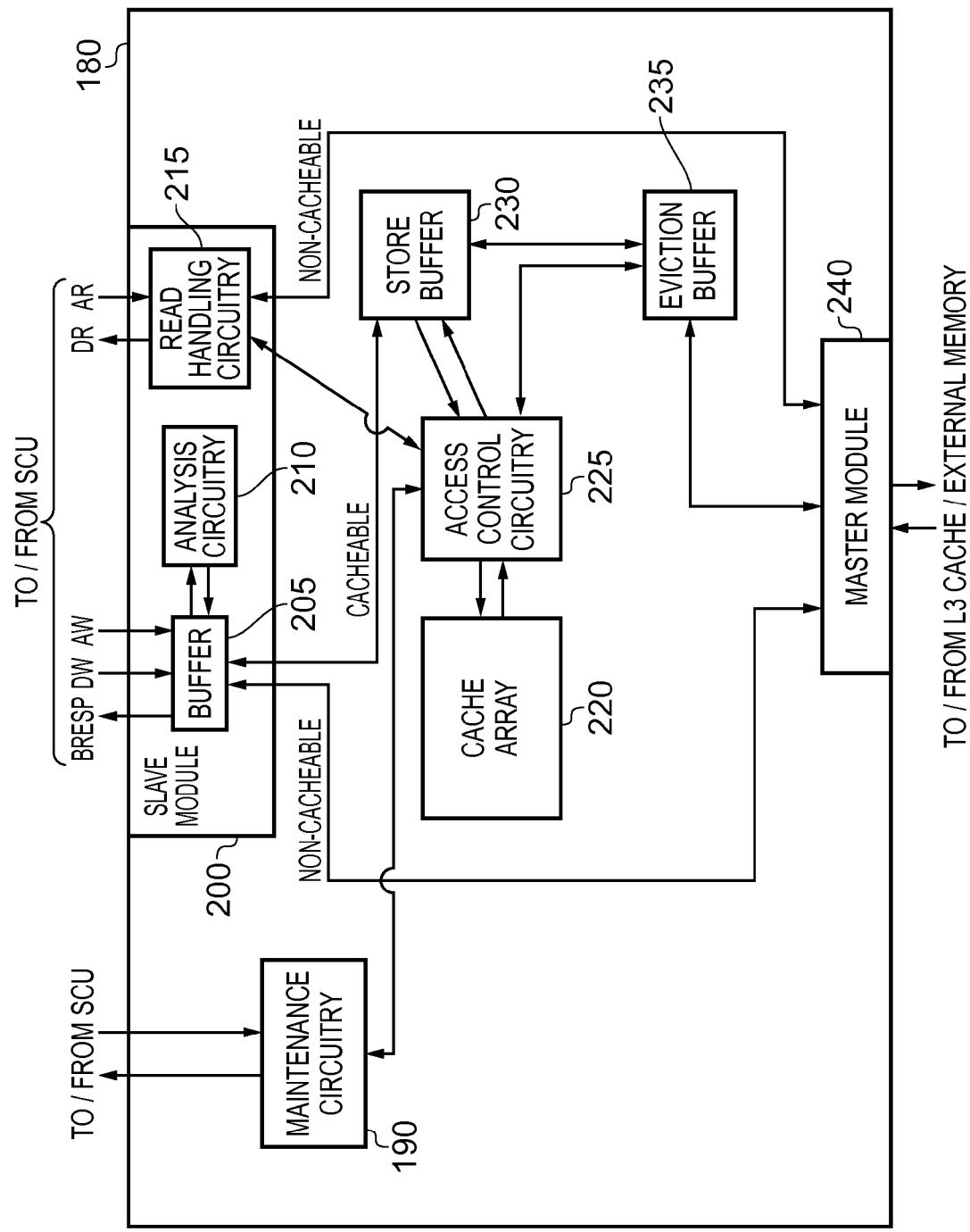
FIG. 3 is a block diagram illustrating components provided within the shared level two cache of FIG. 2 in accordance with one embodiment.

FIG. 3 is a block diagram showing in more detail components provided within the shared level two cache 180 in accordance with one embodiment. In particular, the level two cache 180 will include a cache array 220 providing the tag and data RAMs, and access control circuitry 225 for performing cache access operations in respect of the cache array. A slave module 200 is provided to interface the level two cache with the SCU 175. Both write transactions and read transactions may be performed in respect of the level two cache, and in one embodiment the interface with the SCU provides a number of separate buses over which write transactions and read transactions may pass. In particular, a write address (AW) bus is used to transfer from the SCU to the slave module 200 the address specified by each write transaction, whilst a separate write data bus (DW) is used to pass the associated write data to the slave module 200. A write response (BRESP) bus is also provided over which the slave module issues a write response back to the SCU on completion of the write operation (or in one embodiment to indicate acceptance of the write transaction by the level two cache). Similarly, for read transactions, a read address (AR) bus is provided over which the slave module receives the read address specified by each read transaction, along with a separate read data (DR) bus over which the read data of each transaction is returned to the SCU 175 from the level two cache.

For the purposes of discussing performance of cache maintenance operations, the handling of read transactions is not relevant, and accordingly will only be discussed very briefly herein. In particular, for a cacheable read transaction, the read handling circuitry 215 within the slave module 200 will issue a request to the access control circuitry 225 to cause a lookup operation to be performed within the cache array 220 in order to identify whether the data that is the subject of the read transaction is available within the cache array. If it is, then the data will be returned from the cache array via the read handling circuitry back to the SCU 175. If the requested data it not present, then a request will be issued from the master module 240 to the level three cache/external memory in order to retrieve the data. The master module is also used to retrieve the data for any non-cacheable read transactions.

Any evicted data from a level one cache (including evicted data that has resulted from performance of a cache maintenance operation) will be forwarded from the SCU 175 to the level two cache as a write transaction, and the address, evicted data and associated control information will be buffered within the buffer 205 for analysis by the analysis circuitry 210. In particular, the analysis circuitry 210 will determine whether the write transaction relates to a cacheable address or a non-cacheable address. In the event of a non-cacheable address, the write transaction will be routed straight through to the master module 240 for propagation over the bus 195 to the level three cache/external memory. However, for a cacheable address, the write transaction will be written into the store buffer 230.

Whenever the store buffer is non-empty, the store buffer will send a request to the access control circuitry 225. When the access control circuitry 225 is available for the store buffer, it will signal this to the store buffer, and the oldest transaction in the store buffer will then be forwarded to the access control circuitry 225 to cause the access control circuitry to perform a cache lookup within the cache array 220. In the event of a hit, the contents of the hit cache line will be updated within the evicted data specified by the write transaction. In the event that the evicted data has maintenance indication data associated therewith, the access control circuitry will also modify its eviction handling operation in order to cause various additional steps to be performed, including causing the store buffer 230 to forward the transaction on to the eviction buffer 235 from where that data will be evicted from the level two cache via the master module 240 in due course.

In some implementations, a communication path between the store buffer 230 and the eviction buffer 235 may already be provided to support write streaming operations. In accordance with write streaming operations, when a line of data is identified as being part of a write stream, it may be determined that it is not appropriate to allocate the data into the cache, but instead the L2 cache may be arranged to directly evict that data to the L3 cache/memory system via the eviction buffer 235. The modified eviction handling operation used in the above described embodiment can make use of this already provided communication path between the store buffer 230 and the eviction buffer 235.

More details of exactly how the eviction handling operation performed by the access control circuitry 225 is modified if the evicted data is accompanying by maintenance indication data will be provided later with reference to FIGS. 4A and 4B.

As also shown in FIG. 3, the maintenance circuitry 190 can communicate with the SCU 175, via which it can be instructed to perform cache maintenance operations directly within the level two cache. In particular, the maintenance circuitry will then communicate with the access control circuitry 225 in order to coordinate the required cache maintenance operations.

However, as will be apparent from the earlier discussions, in accordance with the described embodiment, in situations where performance of a cache maintenance operation within the level one cache results in data being evicted from the level one cache, maintenance indication data is associated with that evicted data in order to cause the required cache maintenance to be incorporated within the eviction handling operation performed by the access control circuitry 225 in order to process the evicted data, and in such situations there will be no need for the maintenance circuitry 190 to separately perform any cache maintenance operation, thereby significantly improving efficiency.

There are a number of ways in which the maintenance indication data can be provided to the second level cache in association with the evicted data. In one embodiment, the maintenance indication data is encoded into a control signal passed to the second level cache in association with the evicted data. In one particular embodiment, the maintenance indication data is encoded within a two-bit signal, a first value (e.g. 01) being used to identify that the associated evicted data has arisen from performance of a clean cache maintenance operation, a second value (e.g. 10) being used to identify that the associated evicted data has arisen from performance of a clean and invalidate cache maintenance operation, and a third value (e.g. 00) being used to indicate that there is no maintenance indication data, i.e. the evicted data has not arisen from performance of a cache maintenance operation.

Figure 4A:
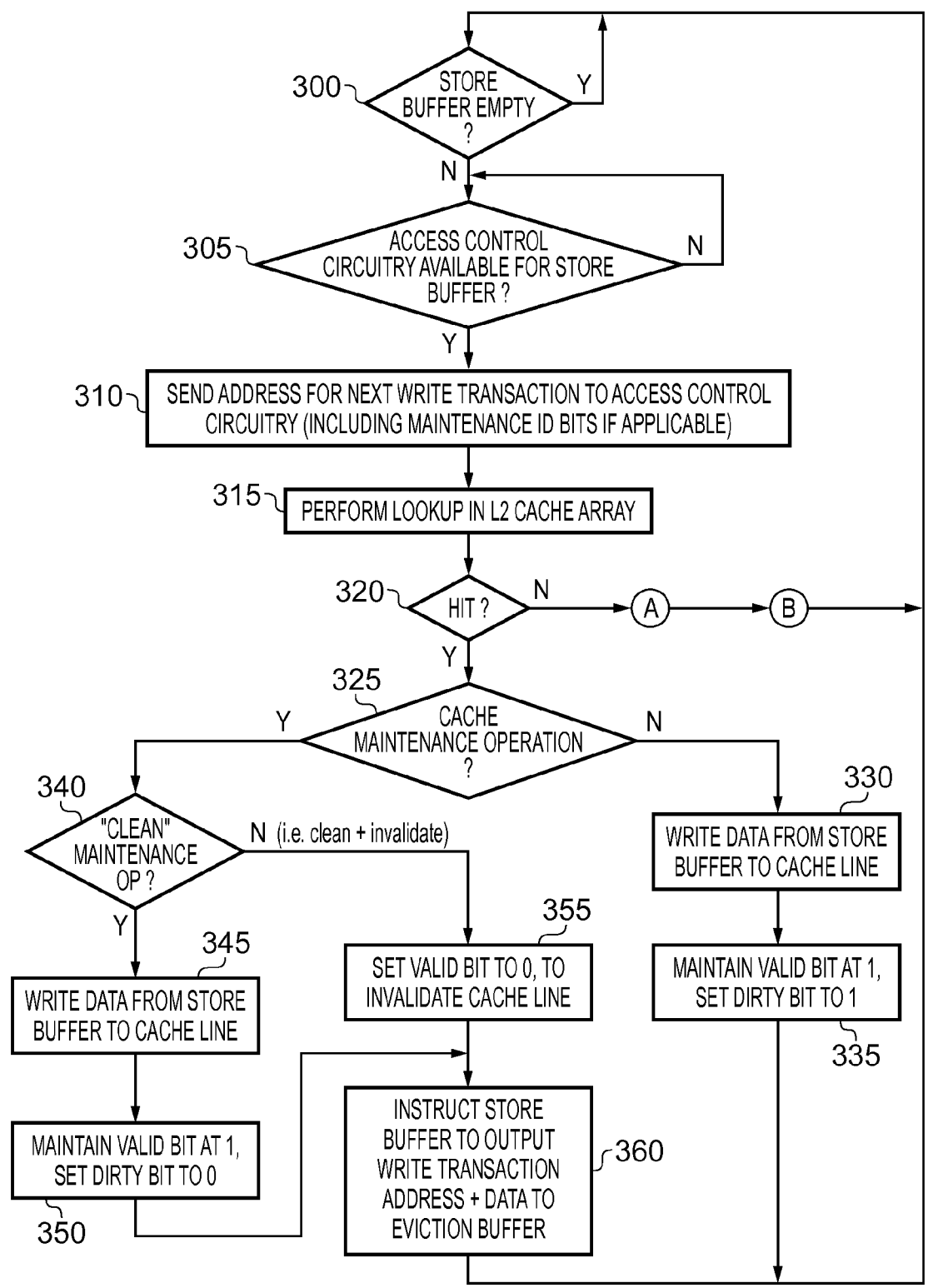
FIGS. 4A and 4B are flow diagrams illustrating the operation of the store buffer and access control circuitry of FIG. 3 in accordance with one embodiment.

FIG. 4A is a flow diagram illustrating the operation of the store buffer 230 and access control circuitry 225 of FIG. 3 in accordance with one embodiment. At step 300, it is determined whether the store buffer is empty. If it is determined that the store buffer is not empty, the process proceeds to step 305, where it is determined whether the access control circuitry 225 is available for the store buffer 230. As discussed earlier, this is typically determined by the store buffer issuing a request to the access control circuitry 225, with the access control circuitry responding when it is available to accept a write transaction from the store buffer.

When the access control circuitry is available, the process proceeds to step 310, where the address for the next write transaction (i.e. the oldest pending write transaction in the store buffer) is issued to the access control circuitry (including any maintenance indication bits if the write transaction identifies evicted data resulting from performance of a cache maintenance operation within the level one cache). Thereafter, the access control circuitry 225 performs a lookup operation within the level two cache array 220 at step 315. As a result of the lookup, it is determined at step 320 whether a hit has been detected within the cache array 220. If it has, then the process proceeds to step 325, where it is determined whether the current write transaction identified by the store buffer relates to evicted data produced as a result of a cache maintenance operation performed in the level one cache. If not, then the process proceeds to step 330, where the data for the transaction held in the store buffer is written into the cache line identified by the hit condition. In addition, at step 335, the valid bit for that cache line is maintained at a logic one value (to indicate that the cache line is valid, and the dirty bit is set to a logic one value (irrespective of whether it was previously at a logic zero or a logic one value), the logic one value identifying that the cache line is dirty. Thereafter, the process returns to step 300.

However, if the evicted data related to a cache maintenance operation, then the eviction handling operation is modified as shown in FIG. 4A. In particular, at step 340, it is determined whether the maintenance operation is a clean cache maintenance operation, and if so then steps 345 and 350 are performed, these being identical to the earlier described steps 330 and 335, except for in one detail. In particular, at step 350, the dirty bit is set to zero, to identify the line as clean, in contrast to step 335 where the dirty bit was set to a logic one value.

Thereafter, the process proceeds to step 360, where the store buffer 230 is instructed to output the write transaction address and data to the eviction buffer 235. In one embodiment, at this point any associated maintenance indication data does not need to be forwarded on to the eviction buffer, as that information is no longer required. However, if the earlier described recursive approach is taken to cause the level 3 cache to also perform a modified eviction handling operation, then the maintenance indication data would be forward to the eviction buffer for onward propagation to the level 3 cache.

Whilst step 360 is shown as being performed after steps 345 and 350, in one embodiment step 360 can be performed in parallel with steps 345 and 350.

If at step 340 it is determined that the cache maintenance operation is not a clean cache maintenance operation, then this means that the cache maintenance operation is a clean and invalidate cache maintenance operation, and accordingly the process proceeds to step 355 where the valid bit for the hit cache line is set to zero, to identify that cache line as being invalid. Thereafter, the process proceeds to step 360. Following step 360, the process returns to step 300. Step 360 can be performed in parallel with step 355 if desired. In one example implementation, it could be decided in relation to step 340 to demote "clean" operations to "clean and invalidate" operations so that the "no" path is always taken, causing step 355 to be performed rather than steps 345 and 350. In such an implementation, steps 340, 345 and 350 could be removed, and the yes path from step 325 would proceed directly to step 355.

Figure 4B:
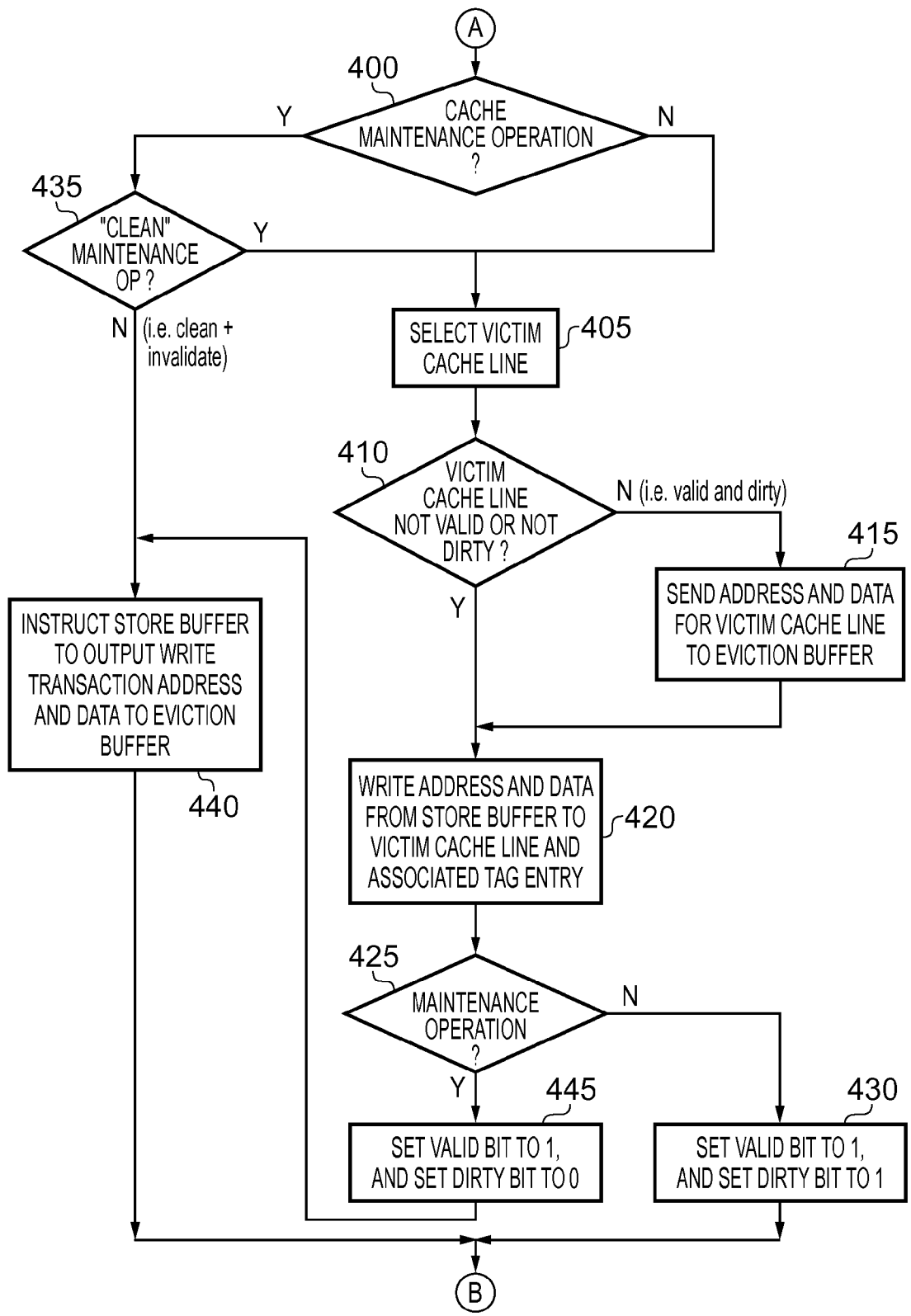

If a hit is not detected at step 320, then the process of FIG. 4B is performed between points A and B of FIG. 4A. In particular, at step 400, it is determined whether the evicted data that is the subject of the write transaction was produced as a result of performance of a cache maintenance operation within the level one cache. If not, the process proceeds to step 405, where a victim cache line is selected within the cache array 220. Various victim selection algorithms are well known, and in one example a random selection of a victim cache line may be performed at step 405. Following selection of the victim cache line, it is determined at step 410 whether the victim cache line is marked as invalid, or is marked as clean. If this is not the case, then this will mean that the victim cache line is valid and dirty, and accordingly its contents need to be evicted from the level two cache before they are overwritten. Hence, at step 415, the address and data for the victim cache line are sent to the eviction buffer.

Following step 415, or directly following step 410 if it is determined that the victim cache line is not valid or is not dirty, the process proceeds to step 420, where the address and data for the current transaction stored within the store buffer are written into the victim cache line and associated tag entry of the cache array 220. In addition, the valid and dirty bits are set, how they are set being dependent on whether the current transaction being processed relates to eviction data resulting from a cache maintenance operation or not. In particular, if it is determined at step 425 that the write transaction did relate to evicted data from a cache maintenance operation, then the valid bit is set to one and the dirty bit is set to zero at step 445. Otherwise, the valid bit is set to one and the dirty bit is set to one at step 430. Following step 430, the process proceeds to point B. However, following step 445, the process proceeds to step 440.

If at step 400, it is determined that the current write transaction specifies evicted data resulting from a cache maintenance operation performed in the level one cache, then it is determined at step 435 whether the cache maintenance operation is a clean cache maintenance operation. If so, the process proceeds to step 405, and as discussed earlier will proceed through the steps in the right hand side of FIG. 4B and via step 445 to step 440. Otherwise, it will be determined that the cache maintenance operation is a clean and invalidate cache maintenance operation, and the process will then proceed directly to step 440 from step 435, since none of the other steps are required.

At step 440, the store buffer is instructed to output the write transaction address and data to the eviction buffer (and optionally the maintenance indication data if the level 3 cache is also to perform a modified eviction handling operation), whereafter the process proceeds to point B shown in FIG. 4A.

As mentioned in connection with the earlier description of FIG. 4A, in one example implementation it could be decided to demote "clean" operations to "clean and invalidate" operations. This would simplify the operation flow. In particular step 435 could be removed, and the "yes" path from step 400 would pass directly to step 440. Similarly steps 425 and 445 could be removed, with step 420 proceeding directly to step 430.

The above described embodiments provide a particularly efficient mechanism for handling cache maintenance operations within a hierarchical cache structure, and in particular enable the number of cache accesses within the hierarchical cache structure to be reduced. Such embodiments also reduce idle time that occurs in known prior art systems where an eviction operation has to be performed prior to the cache maintenance operation then being performed.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus, said data processing apparatus comprising:

data processing circuitry configured to perform data processing operations on data;

a hierarchical cache structure configured to store at least a subset of said data for access by the data processing circuitry, said hierarchical cache structure having a first level cache and a second level cache, the hierarchical cache structure being responsive to an access request issued by the data processing circuitry and specifying an address, to access in the first level cache the data identified by the address if that data is stored in the first level cache, and to seek to access in the second level cache the data identified by the address if that data is not stored in the first level cache, and any data evicted from the first level cache being routed to the second level cache;

access control circuitry associated with the second level cache and configured, in response to data evicted from the first level cache, to perform an eviction handling operation requiring access to the second level cache;

cache maintenance circuitry configured to perform a cache maintenance operation requiring cache maintenance to be performed in both the first level cache and the second level cache;

if the cache maintenance required in respect of the first level cache during performance of the cache maintenance operation causes data to be evicted from the first level cache, the cache maintenance circuitry being configured to cause maintenance indication data to be passed to the second level cache in association with the evicted data;

the access control circuitry being responsive to the maintenance indication data to modify the eviction handling operation performed in response to the evicted data in order to cause the required cache maintenance for the second level cache to be incorporated within the eviction handling operation.

2. A data processing apparatus as claimed in claim 1, wherein:

the evicted data is passed to the second level cache with a corresponding address indication, and the access control circuitry is configured, when performing said eviction handling operation, to use said corresponding address indication to perform a lookup within the second level cache to determine if a hit condition is detected, the hit condition identifying a cache line within the second level cache that is storing data associated with the corresponding address indication;

if the hit condition is detected, the access control circuitry is further configured, when performing the eviction handling operation, to update the cache line identified by the hit condition with the evicted data; and if the evicted data has associated maintenance indication data, the access control circuitry is configured to modify the eviction handling operation by additionally causing the evicted data to be placed in an eviction buffer associated with the second level cache, for subsequent eviction of the evicted data from the second level cache.

3. A data processing apparatus as claimed in claim 2, wherein:

if the evicted data does not have associated maintenance indication data, the access control circuitry is further configured, when updating the cache line identified by the hit condition with the evicted data, to mark the cache line as valid and containing dirty data;

if the evicted data has associated maintenance indication data, the access control circuitry is configured, when updating the cache line identified by the hit condition with the evicted data, to further modify the eviction handling operation by marking the cache line as valid but not containing dirty data.

4. A data processing apparatus as claimed in claim 2, wherein if the associated maintenance indication data identifies that the cache maintenance operation requires invalidation of the evicted data within the hierarchical cache structure, then the access control circuitry is configured to further modify the eviction handling operation by setting an invalid flag for the cache line identified by the hit condition instead of updating that cache line with the evicted data.

5. A data processing apparatus as claimed in claim 2, wherein:

said second level cache includes a store buffer in which the evicted data is temporarily stored until the eviction handling operation has been performed by the access control circuitry;

if the evicted data has associated maintenance indication data, the access control circuitry is configured to cause the evicted data to be routed from the store buffer to the eviction buffer.

6. A data processing apparatus as claimed in claim 2, wherein:

if the hit condition is not detected, the access control circuitry is further configured, when performing the eviction handling operation, to select a victim cache line from within the second level cache, to write the evicted data into the victim cache line, and to associate the corresponding address indication with that victim cache line.

7. A data processing apparatus as claimed in claim 6, wherein:

if the evicted data does not have associated maintenance indication data, the access control circuitry is further configured, when performing the eviction handling operation, to mark the victim cache line as valid and containing dirty data;

if the evicted data has associated maintenance indication data, the access control circuitry is configured to further modify the eviction handling operation by marking the victim cache line as valid but not containing dirty data.

8. A data processing apparatus as claimed in claim 6, wherein if current data stored in the victim cache line at the time of selection by the access control circuitry is marked as valid and dirty, that current data is routed to the eviction buffer prior to writing the evicted data into the victim cache line and associating the corresponding address indication with that victim cache line.

9. A data processing apparatus as claimed in claim 1, wherein:

said data processing circuitry comprises a plurality of data processing units;

said first level cache comprises a plurality of cache units, each cache unit being associated with a corresponding one of said data processing units; and said second level cache is shared by said plurality of data processing units.

10. A data processing apparatus as claimed in claim 9, further comprising:

a snoop control unit coupled between the first level cache and the second level cache, and configured to manage coherency of data within the cache units of the first level cache and the second level cache;

the snoop control unit being configured, in response to evicted data output by one of said cache units of the first level cache, to output the evicted data to the second level cache, and further being configured, if the evicted data resulted from performance of the cache maintenance operation, to output the maintenance indication data to the second level cache in association with the evicted data.

11. A data processing apparatus as claimed in claim 1, wherein said second level cache is integrated onto an integrated circuit that also provides said data processing circuitry and said first level cache.

12. A data processing apparatus as claimed in claim 1, wherein:

if the cache maintenance required in respect of the first level cache during performance of the cache maintenance operation does not cause data to be evicted from the first level cache, the cache maintenance circuitry is configured to directly initiate the required cache maintenance in the second level cache.

13. A data processing apparatus as claimed in claim 1, wherein:

the maintenance indication data is encoded into a control signal passed to the second level cache in association with the evicted data;

the control signal is encoded with a value chosen from a first set of values to identify the maintenance indication data; and the control signal is encoded with a value not in said first set of values to identify that there is no maintenance indication data.

14. A data processing apparatus as claimed in claim 13, wherein:

the control value is encoded with a first value chosen from said first set of values to identify that the associated evicted data has arisen from performance of a "clean" cache maintenance operation; and the control value is encoded with a second value chosen from said first set of values to identify that the associated evicted data has arisen from performance of a "clean and invalidate" cache maintenance operation.

15. A data processing apparatus as claimed in claim 14, wherein the hierarchical cache structure further comprises a third level cache, and the data processing apparatus further comprises:

further access control circuitry associated with the third level cache and configured, in response to data evicted from the second level cache, to perform a further eviction handling operation requiring access to the third level cache;

if the evicted data from the first level cache has associated maintenance indication data, the access control circuitry associated with the second level cache is configured to modify the eviction handling operation by additionally causing the evicted data to be placed in an eviction buffer associated with the second level cache, for subsequent eviction of the evicted data from the second level cache to the third level cache;

the further access control circuitry being responsive to maintenance indication data being identified in the evicted data received from the eviction buffer, to modify the further eviction handling operation performed in response to the evicted data in order to cause the cache maintenance for the third level cache to be incorporated within the further eviction handling operation.

16. A method of handling performance of a cache maintenance operation within a data processing apparatus having data processing circuitry for performing data processing operations on data, and a hierarchical cache structure for storing at least a subset of said data for access by the data processing circuitry, said hierarchical cache structure having a first level cache and a second level cache, the hierarchical cache structure being responsive to an access request issued by the data processing circuitry and specifying an address, to access in the first level cache the data identified by the address if that data is stored in the first level cache, and to seek to access in the second level cache the data identified by the address if that data is not stored in the first level cache, and any data evicted from the first level cache being routed to the second level cache, the method comprising:

in response to data evicted from the first level cache, performing an eviction handling operation requiring access to the second level cache;

performing a cache maintenance operation requiring cache maintenance to be performed in both the first level cache and the second level cache;

if the cache maintenance required in respect of the first level cache during performance of the cache maintenance operation causes data to be evicted from the first level cache, issuing maintenance indication data to the second level cache in association with the evicted data; and responsive to the maintenance indication data, modifying the eviction handling operation performed in response to the evicted data in order to cause the required cache maintenance for the second level cache to be incorporated within the eviction handling operation.

17. A data processing apparatus, said data processing apparatus comprising:

data processing means for performing data processing operations on data;

a hierarchical cache means for storing at least a subset of said data for access by the data processing means, said hierarchical cache means having a first level cache means and a second level cache means, the hierarchical cache means being responsive to an access request issued by the data processing means and specifying an address, to access in the first level cache means the data identified by the address if that data is stored in the first level cache means, and to seek to access in the second level cache means the data identified by the address if that data is not stored in the first level cache means, and any data evicted from the first level cache means being routed to the second level cache means;

access control means associated with the second level cache means and, in response to data evicted from the first level cache means, for performing an eviction handling operation requiring access to the second level cache means;

cache maintenance means for performing a cache maintenance operation requiring cache maintenance to be performed in both the first level cache means and the second level cache means;

if the cache maintenance required in respect of the first level cache means during performance of the cache maintenance operation causes data to be evicted from the first level cache means, the cache maintenance means for causing maintenance indication data to be passed to the second level cache means in association with the evicted data;

the access control means, responsive to the maintenance indication data, for modifying the eviction handling operation performed in response to the evicted data in order to cause the required cache maintenance for the second level cache means to be incorporated within the eviction handling operation.

* * * * *